United States Patent [19]

Ward et al.

[11] Patent Number: 5,573,189
[45] Date of Patent: Nov. 12, 1996

[54] HIGH APPLICATION RATE EXTRUDABLE POLYMERS AND METHOD OF MANUFACTURE

[75] Inventors: Brian J. Ward, Valley Falls; Edward M. Jeram, Burnt Hills; Richard A. Striker, Wynantskill; Lawrence M. Wichelns, Clifton Park, all of N.Y.

[73] Assignee: General Electric Company, Waterford, N.Y.

[21] Appl. No.: 506,244

[22] Filed: Jul. 24, 1995

Related U.S. Application Data

[63] Continuation of Ser. No. 165,219, Dec. 10, 1993, abandoned.

[51] Int. Cl.$^6$ .................................................... B02C 23/18
[52] U.S. Cl. ................................................. 241/21; 241/27
[58] Field of Search ................................ 241/16, 21, 27; 366/69, 92–99; 523/213, 351

[56] References Cited

U.S. PATENT DOCUMENTS

| | | |
|---|---|---|
| 3,837,878 | 9/1974 | Beers . |
| 3,865,778 | 2/1975 | Christie . |
| 3,992,350 | 11/1976 | Benson et al. .............. 241/DIG. 37 X |
| 4,029,629 | 6/1977 | Jeram . |
| 4,425,384 | 1/1984 | Brownscombe . |
| 4,514,466 | 4/1985 | Leon, Jr. et al. . |
| 4,529,522 | 7/1985 | Schmitt . |
| 4,580,794 | 4/1986 | Gibbons . |
| 4,724,167 | 2/1988 | Evans et al. . |
| 4,806,586 | 2/1989 | Nakai . |
| 4,960,811 | 10/1990 | Evans . |
| 5,024,863 | 6/1991 | Gibbon . |
| 5,106,934 | 4/1992 | Wengrovius et al. . |
| 5,112,640 | 5/1992 | Warunek et al. . |
| 5,198,171 | 3/1993 | Kasahara et al. . |

FOREIGN PATENT DOCUMENTS

| | | |
|---|---|---|
| 0305032 | 3/1989 | European Pat. Off. . |
| 0542472 | 5/1993 | European Pat. Off. . |
| 0570978 | 11/1993 | European Pat. Off. . |

*Primary Examiner*—Timothy V. Eley
*Attorney, Agent, or Firm*—Kenneth S. Wheelock

[57] ABSTRACT

An extrudable composition formed of a blend of a polymer and a finely divided filler is prepared by combining the materials under conditions of high shear forces resulting in a composition which when diluted to a selected level has an application rate which is relatively higher than a composition having the same relative proportions of polymer and filler combined under conditions of low shear, the high shear forces reducing the aggregate size. The invention is also directed to a method for reducing the initial average aggregate size of a filler dispersed in a polymer by subjecting the mixture to high shear forces in a high intensity mixer.

9 Claims, No Drawings

HIGH APPLICATION RATE EXTRUDABLE POLYMERS AND METHOD OF MANUFACTURE

This is a continuation of copending application Ser. No. 08/165,219, filed on Dec. 10, 1993, which is now abandoned.

BACKGROUND OF THE INVENTION

The invention pertains to silica filled moldable polymers. In particular, the invention pertains to injection moldable polymers wherein the filler is processed into the polymer blends such that the application rate of the blend is significantly increased. More particularly the invention pertains to silica filled moldable polymers where the application rate of the polymer blend has been increased by reducing the average aggregate size of the silica aggregates comprising the silica filler.

Known liquid injection moldable polymers usually employ a polymer composition, one or more fillers, a catalyst and an optional cross-linking agent. The liquid injection polymer composition may be injection molded to form a variety of small parts.

Large injection molded parts are desired. However, it has been found difficult to mold large parts because the molding material has a tendency to cure before the mold is filled. One cause of this problem appears to be traceable to the properties of the filler material. A commonly used filler material is fumed silica that has various structural characteristics. At one level, fumed silica comprises individual sub micron size spherical particles. These particles tend to aggregate into dendritic structures having long radial arms. The aggregates tend to agglomerate into groups or clumps. At sufficiently small inter aggregate distances or at sufficiently high concentrations of the aggregates, the long arms of the dendritic structures begin to interlock and hinder the flow of the mixture containing such interlocked aggregates.

The application rate of materials incorporating fumed silica thus appears to be a function of the average aggregate size. In particular, the length of the radial arms of the dendritically shaped aggregates appear to affect the application rate and physical properties.

U.S. Pat. No. 3,953,487 discloses a method for preparing hydrophobic $SiO_2$ by reacting solid $SiO_2$ of a fine aggregate size with organosilicon compounds while subjecting the reaction mixture to mechanical impact, resulting in comminution of the $SiO_2$ aggregates and agglomerates thereof. In a particular example, $SiO_2$ aggregates are subjected to a ball milling operation to reduce the average aggregate size. The material in the '487 patent may be combined with polymers of the type described in the above-identified application resulting in liquid injection moldable polymers with acceptable application rates. However, the fumed silica material processed in accordance with the '487 patent is difficult to manufacture requiring many hours of ball milling to achieve the lower aggregate size required. The process is unattractive from a manufacturing point of view because of the time required to prepare the silica in a finely divided state, dust and associated contamination problems. These considerations render the material expensive to purchase.

It is therefore desirable to find an effective method to reduce the average aggregate size of finely divided silica by an amount sufficient to achieve high application rites in polymer compositions having satisfactory physical properties.

SUMMARY OF THE INVENTION

The present invention is based upon the discovery that finely divided silica fillers that are normally difficult to comminute using conventional particle or aggregate size reduction techniques may be successfully comminuted by those same conventional size reduction techniques by the use of liquid processing aids that act to transfer shear forces to the aggregates comprising the finely divided silica filler thereby reducing average aggregate size. The liquid processing aid that enables such comminution may vary in viscosity and chemical nature all the way from water and low molecular weight organic solvents to various liquid polymers such as polyesters or polysilicones that may or may not be susceptible to further polymerization or cross linking. In the case of the instant invention, a preferred processing aid comprises a siloxane polymer such that the processing aid and the silica filler comprise components of a liquid injection molding base composition. When the base composition is compounded into an extrudable material (e.g. a liquid injection moldable composition), the resulting material has an application rate which is significantly higher than prior extrudable materials containing the same proportions of polymers and fillers.

In a particular embodiment, the invention is directed to a base composition comprising a blend of:

(A) a siloxane polymer having a viscosity from about 3,000 to about 1,500,000 cps at 25° C.; and (B) a fumed silica filler having a surface area ranging from about 50 to about 600 m2/gm, and an initial unaltered average aggregate size of 0.20 to 0.35 microns, said blend having been subjected to high shear rate forces in a high intensity mixer for a time sufficient to reduce the initial average aggregate size of the fumed silica by an amount sufficient to achieve relatively high application rates in compositions having desirable physical properties. The ratio of (A) to (B) ranges from about 65:35 to about 33:66.

The compositions of the invention may also include (C) a cross-linking agent; (D) a catalyst; (E) an anti structuring agent; and (F) and in-situ filler surface treatment, which may also function as a dispersing agent.

The invention is also directed to a method for reducing the initial unaltered average aggregate size of filler dispersed in a polymer comprising subjecting a mixture of a polymer and fumed silica filler to high shear forces in a high intensity mixer for a time sufficient to reduce the initial average aggregate size to a desirable level.

DESCRIPTION OF THE INVENTION

The invention is directed to a composition, for example a base polymer (A) having a viscosity from about 3,000 to about 1,500,000 cps at 25° C. and (B) a fumed silica filler having a surface area between about 50 and 600 $m_2$/gm and an initial average aggregate size of about 0.10 to 0.25 microns. The base composition being a blend of (A) and (B) and having been subjected to high intensity shear forces in a suitable mixer for a time sufficient such that the average aggregate size is reduced by about one half to about two thirds of the initial unaltered average aggregate size.

The composition according to the present invention may be combined with other materials including in-situ filler treatments, catalysts, cross-linking agents, adhesion promoters, additives and the like in combination with polymer components for producing extrudable compositions suitable for mold making, liquid injection molding and sealant applications having high application rates and improved strength.

The components of the composition are hereinafter defined. (A) is a low viscosity organopolysiloxane fluid which when combined with relatively high portions of fumed silica and subjected to high shear forces in a high intensity mixer results in a high viscosity blend or base polymer that can be formulated into compositions having a high application rate.

In the examples below (A1) is a vinyl chain-stopped polymer having a viscosity of about 40,000 cps at 25° C. and having a vinyl content of about 0.08 weight percent;

(A2) is a vinyl chain-stopped polymer having a viscosity of about 500 cps at 25° C. and having a vinyl content of about 1.65 weight percent;

(A3) is a dimethyl vinyl-stopped trimethyl-stopped polymer having a viscosity of 500 cps at 25° C. (no vinyl-on-chain) having a vinyl content of about 0.195 weight percent;

(A4) is a hydride cross-linking resin having the general formula:

$$M_2^H Q$$

wherein M is:

$$R^1 R^2 SiO_{1/2}$$

wherein $R^1$ is hydrogen and $R^2$ is a hydrocarbon radical free of aliphatic unsaturation containing from 1 to about 8 carbon atoms, preferable $R^2$ is $CH_3$ and wherein the material has a hydrogen content of about 0.9 weight percent.

Component (B) is a fumed silica having a surface area ranging from about 50 to about 600 $m^2/gm$ in the untreated state. Preferably, the surface area ranges from about 90 to about 400 $m^2/gm$. (B) has an initial maximum average aggregate size roughly about 0.25 micron. After treatment in accordance with the invention, the average aggregate size is reduced by about one half to about two thirds. If the average aggregate size is not sufficiently reduced, the application rate of the resulting material may not be increased significantly.

The fumed silica may be pretreated or treated in-situ. In the examples below, (B1) is a methyl tetramer treated fumed silica having a surface area of about 200 $m^2/gm$ in the untreated state having an initial average aggregate size of about 0.25 micron. (B2) is a methyl tetramer and silazane treated fumed silica having a surface area of about 200 $m^2/gm$ in the untreated state (160 $m^2/gm$ treated) having an initial average aggregate size of about 0.25 micron. (B3) is a methyl tetramer treated fumed silica having a surface area of about 325 $m^2/gm$ in the untreated state having an initial average aggregate size of about 0.25 micron. Treatment of the silica surface is desirable because reactive surface groups are rendered inactive to recondensation thereby preventing the recombination of newly separated aggregates or agglomerates.

(A) and (B) are combined in ratios ranging from about 65:35 to about 33:66. These ratios permit the filler average aggregate size to be reduced during high intensity mixing. These ranges of ratios are preferred in order to achieve the desired size reduction of the average aggregates. The resulting materials can be and usually are further diluted to form compositions having a polymer to filler ratio of about 75:25. The compositions resulting from the process of the instant invention have the more desirable, relatively high application rates along with good physical properties. In other words, blending polymer and filler in the ranges of ratios set forth and under conditions of high shear results in base compositions that may be combined with other materials to achieve the desired application rates and physical properties.

Component (C) is a cross-linking agent. In particular, Component (C) may be a hydride cross-linking agent. In the examples below, (C1) is a trimethylhydrogen-stopped dimethylsiloxane-on-chain methyl-hydrogen-siloxane-on-chain polymer having a hydrogen content of about 0.8 weight percent.

Component (D) is an addition cured catalyst. In the example below, (D) is a platinum containing catalyst such as set forth in Karstedt, U.S. Pat. No. 3,814,730, containing 20 parts per million platinum. Generally, this type of platinum complex is formed by reacting chloroplatinic acid containing 6 moles of water of hydration with dimethylvinyl stopped disiloxane in the presence of sodium bicarbonate in an ethanol solution.

Component (E) is an anti-structuring agent. In the examples below, (E1) is an MQ fluid in which the ratio of M to Q is about 1 and having a silanol content of about 2.0 weight percent. (E2) is a silanol stopped fluid having the formula:

$$HOD_6OH$$

containing about 5 to 6 percent OH radicals.

Component (F) is an in-situ surface treatment for the fumed silica. Surface treatments include a cyclopolysiloxane treatment as set forth in Lucas, U.S. Pat. No. 2,938,009 or silazane treatment as set forth in Smith, U.S. Pat. No. 3,635,743. In the examples below, (F1) is hexamethyldisilazane and (F2) is tetramethyldivinyldisilazane. (F2) also is used as a dispersing agent as noted in the examples.

In accordance with the present invention, various materials may be formed using the composition of the present invention as a base composition. For example, extrudable materials such as addition cured and silanol cured mold making materials having a viscosity of between 3,000 and 100,000 cps at 25° C. may be formed. An exemplary material is set forth in Beers, U.S. Pat. No. 3,847,848 which discloses a two-component RTV silicone rubber suitable for molding applications comprising a base linear fluid organopolysiloxane containing terminal silicone bonded hydroxy groups and having a viscosity of 1,000 to 10,000,000 cps at 25° C.

A filler or extender is usually added to the room temperature vulcanizable (RTV) silicone rubber formulation. Typically such fillers or extenders are moderate to high surface area porous inorganic oxides such as fumed silica, silica aerogel, silica xerogel, alumina, gamma-alumina, titanium dioxide (either as anatase or rutile), and the like. Depending on the properties desired in the filler or the extender, the material may be used in either an untreated or treated state. An example of a treated filler would be a fumed silica treated with cyclo-octamethyltetrasiloxane. Various other treatments are known in the art and are routinely employed.

Liquid injection molding materials may be materials such as those set forth in Jeram et al., U.S. Pat. No. 4,340,709 in which an addition curing silicone composition with a low viscosity in the uncured state and high physical strength in the cured state comprises a vinyl containing diorganopolysiloxane polymer, a platinum catalyst, a hydride cross-linking agent and a linear hydride coupler in which the viscosity of the linear hydride coupler varies from about 1 to about 1,000 cps at 25° C. Resulting liquid injection molded materials have a viscosity from about 500,000 to about 1,500,000 cps at 25° C. Other exemplary materials include materials such as set forth in Jeram et al. U.S. Pat. No. 5,082,866.

Other exemplary injection moldable materials are disclosed in Modic, U.S. Pat. No. 3,436,366 and Jeram, U.S. Pat. Nos. 3,957,713, 4,029,629 and 4,041,010.

Sealant materials generally have a viscosity of about 50,000 to about 600,000 cps at 25° C. Exemplary materials are disclosed in Bruner, U.S. Pat. Nos. 3,077,465 and 3,035,016 which include a one part RTV acetoxy curing sealant material. Dziark, U.S. Pat. No. 4,417,042 discloses a one part RTV end-capped alkoxy curing sealant formed by reacting a silanol-terminated polysiloxane polymer with an alkoxy functional cross-linking agent in the presence of a condensation catalyst. Silicon-nitrogen compounds and silicon-nitrogen polymers are employed as scavengers for hydroxy groups that are not end-capped. Another exemplary one part RTV alkoxy curing sealant is disclosed in Beers, U.S. Pat. No. 4,100,129 which comprises a silanol chain-stopped polydiorganosiloxane, a cross-linking silane and a silanol reactive organo-metallic ester with metallic bonds yielding a material having high adhesion to a variety of substrates that are difficult to bond.

EXAMPLES

The following examples are illustrative of the invention and should not be considered as limiting the same.

Table I lists the materials used in the examples by component designation.

TABLE I

| | |
|---|---|
| (A1) | VCS - 40,000 cps/25° C. 0.08 wt. % Vi |
| (A2) | VCS - 500 cps/25° C., 1.65 wt. % Vi |
| (A3) | DiMe - Vi stopped, trimethylvinyl-stopped (no VOC) 500 cps/25° C., 0.195 wt. % Vi |
| (A4) | $M_2^H Q$ Hydride Conc 0.9 wt. % |
| (B1) | Fumed Silica-$D_4$ treated, 200 $m^2$/gm (untreated) |
| (B2) | Fumed Silica-$D_4$ and HMDZ treated, 200 $m^2$/gm (untreated) |
| (B3) | Fumed Silica-$D_4$ and HMDZ treated, 325 $M^2$/gm (untreated) |
| (C1) | Trimethylhydrogen-stopped dimethylsiloxane-on-chain methylhydrogen-on chain, 0.8 wt. % H |
| (D) | Pt based catalyst |
| (E1) | MQ M/Q approx. 1, SiOH 2.0 wt. % |
| (E2) | $HOD_6OH$ approx. 5–6% OH radicals |
| (F1) | Hexamethyldisilazane (HMDZ) |
| (F2) | Tetramethyldivinyldisilazane |

Examples 1–11

Various polymers were placed in high intensity mixer (e.g., Banbury) at low RPM and fumed silica was slowly added. Blending was continued while increasing the RPM of the mixer until the materials reached 125°–160° C., approximately 35–60 min. The blends are set forth in Table II.

Examples 1, 2, and 3 were made to test the ability of a high shear mixing device to reduce the average aggregate size of a typical commercially available fumed silica filler, having a surface area of 200 $m^2$/g. A reduction in the average aggregate size of the fumed silica filler was inferred from physical properties and the application rate and demonstrated by scanning electron micrographs of the filler in the composition after mixing under high shear.

Examples 4 and 5 were made to determine the lower limits of the polymer to filler ratio, 33:66, that would yield useful lowered aggregate sizes of the fumed silica filler.

Examples 6 and 7 were made to demonstrate the general utility of the invention in an intermediate range of polymer to filler ratio, 60:40.

Example 8 is a formulation that has been optimized based on the results obtained from examples 1,2, and 3.

Examples 9 and 10 were made to determine the upper limit of the polymer to filler ratio, about 65:35, that would yield a silica wherein the average aggregate size had been reduced by processing under conditions of high shear.

Example 11 is a polymer filler mixture that uses a different silica from that employed in Examples 1 through 10. The surface area of the silica in Example 11 is 325 $m^2$/g and demonstrates that the invention is not limited to silicas of a particular surface area. The evaluations of example mixtures were as follows:

Example 1: mixed well, material was dry.

Example 2: mixed well, material was sticky.

Example 3: mixed very well, released well from mixer.

Example 4: required a long time to compound and did not easily disperse.

Example 5: 2 parts of a processing aid added to the formulation of example 4, filler dispersed rapidly, desired filler and products obtained.

Example 6: material too thick, too high in viscosity, no efficient mixing.

Example 7: 2 parts of a processing aid to the formulation of example 6, mixed well, released well from mixer, desired effects of smaller average aggregate size of filler were obtained.

Example 8: optimum mixture and optimum properties were obtained.

Example 9: material slightly sticky, marginal filler aggregate size reduction, very little change in average aggregate size.

Example 10: extremely sticky compound, no effect observed in terms of aggregate size reduction and properties of product compound.

Example 11: utilized a higher surface area silica, a fumed silica, mixed very well, released well from mixer, obtained

TABLE II

| Example | 1 | 2 | 3 | 4 | 5 | 6 | 7 | 8 | 9 | 10 | 11 |
|---|---|---|---|---|---|---|---|---|---|---|---|
| (A1) | 100 | 100 | 100 | 100 | 100 | 100 | 100 | 100 | 100 | 100 | 100 |
| (B1) | 100 | — | — | 200 | 200 | — | — | — | — | — | — |
| (B2) | — | 100 | 107 | — | — | 150 | 150 | 107 | 54 | 33 | — |
| (B3) | — | — | — | — | — | — | — | — | — | — | 107 |
| (E2) | — | — | — | — | 2.0 | — | 2.0 | — | — | — | — |
| (F1) | — | — | — | — | — | — | — | 0.27 | — | — | — |
| (F2) | — | 0.4 | 0.213 | — | — | — | — | 0.213 | — | — | — |
| (A):(B) | 50:50 | 50:50 | 48:52 | 33:66 | 33:66 | 40:60 | 40:60 | 48:52 | 65:35 | 75:25 | 48:52 | a lower average aggregate size silica, showed that BET surface area and reduction in average aggregate size do not seem to be related.

100 parts of the Example 1 material was mixed in a dough mixer with other additives as follows:

TABLE III

|  | 12 | 13 | 14 | 15 |
|---|---|---|---|---|
| Example 1 | 100 | 100 | — | — |
| (A1)* | 100 | 100 | 66 | 66 |
| A2) | 04 | 04 | 04 | 04 |
| (A3) | 04 | 04 | 04 | 04 |
| (B1) | — | — | — | 25 |
| (B2) | — | — | 25 | — |
| (A4) + (C1) | ** | ** | ** | ** |
| (D1) | 20 ppm | 20 ppm | 20 ppm | 20 ppm |
| (E1) | 01 | 01 | 01 | 01 |
| (F1) | — | 1.2 | — | 3 |

Notes:
*Enough to achieve standard 25% filler content
**Enough (A4) + (C1) to achieve 1/1.1 to 1/1.6 Vi: Hydride ratio
Filler incorporated quickly into Examples 12 and 13 resulting in application rates of 190 gm/min and 210 gm/min, respectively.
Example 14 - same components as Example 12; blended in a dough mixer (low intensity), application rate - 60 gm/min.
Example 15 - same components as Example 13, blended in dough mixer (low intensity), application rate - 80 gm/min. Except for the application rate, the physical properties of Examples 12–15 were substantially the same.

Table IV is a comparison of the application and other physical properties of a material (ex. 18) manufactured by conventional processing (low intensity mixing) with a polymer to filler ratio of about 66:33 in the mixing step with materials (ex. 16 and 18) manufactured in accordance with the present invention (high intensity mixing) having a reduced amount of polymer during the mixing step. All materials were let down or diluted to a final polymer: Filler ratio of 75:25 for testing after mixing.

TABLE IV

|  | Ex. 16 | Ex. 17 | Ex. 18 |
|---|---|---|---|
| Materials* |  |  |  |
| (A1) | 60 | 65 | 66 |
| (B2) | 40 | 35 |  |
| (B3) |  |  | 33 |
| Properties |  |  |  |
| Application |  |  |  |
| Rate gm/min | 120 | 88 | 70 |
| Shore A | 36 | 37 | 37 |
| Tensile (psi) | 1100 | 1114 | 1150 |
| Elongation | 636 | 613 | 660 |
| 100% modulus | 113 | 116 | 120 |
| Tear (ppi) | 235 | 225 | 220 |

*Let down to 25% filler.

The results shown in Table IV indicate that conventional manufactured compositions (EX. 18) have an application rate of about 70 gm./min. Materials with less polymer but subjected to the high intensity mixing step (Ex. 17) have an application of about 88 gm./min. which is an improvement. Finally, materials with a more reduced amount of polymer (Ex. 16) subjected to high intensity mixing show a dramatically increased application rate of about 120 gm./min. Thus, a polymer: filler ratio of about 65:35 is a useful upper limit.

Other physical properties remain about the same. This indicates that the resulting materials will perform approximately in the same fashion in a particular liquid injection molding application, but the increased application rate will generally allow parts of larger size to be manufactured using the techniques of liquid injection molding when the teachings of the present invention are followed.

What is claimed:

1. A method for manufacturing an extrudable material formed of a blend of component (A), a liquid polymer, and component (B), a finely divided fumed silica filler, said finely divided fumed silica filler having an initial aggregate size, said method comprising the steps of:

a) combining component (A) and component (B) and b) mixing component (A) and component (B) whereby said initial aggregate size of said finely divided fumed silica filler is reduced by an amount from about one-half to about two thirds said initial aggregate size of said finely divided fumed silica filler.

2. The method of claim 1, wherein said combining step comprises reducing the initial average aggregate size of the filler by an amount sufficient to increase application rate while maintaining a satisfactory tensile strength.

3. The method of claim 2, wherein the initial average aggregate size ranges from about 0.20 to about 0.35 microns.

4. The method of claim 3, wherein the initial average aggregate size of the filler, (B) is reduced by about two thirds.

5. The method of claim 1, wherein the combining step comprises reducing the aggregate size of the filler by up to about two thirds of its initial size.

6. A method for increasing the application rate of a mixture comprising a first liquid polymer and a finely divided filler having an initial average aggregate size, said mixture having an application rate below 88 gm/min., said method comprising:

a) mixing
      i) the first liquid polymer and
      ii) the finely divided filler having an initial average aggregate size for a time sufficient to reduce said initial average aggregate size; and b) diluting the mixture of step (a) with a second liquid polymer whereby said application rate of the product resulting steps (a) and (b) is above 88 gm/min.

7. The method of claim 6 wherein said finely divided filler is finely divided fumed silica.

8. The method of claim 7 wherein said first liquid polymer comprises a silicone.

9. The method of claim 8 wherein said second liquid polymer comprises a silicone.

* * * * *